United States Patent [19]

Redmond

[11] 4,274,619
[45] Jun. 23, 1981

[54] WEED EXTRACTION APPARATUS

[76] Inventor: William C. Redmond, 7675 Verdugo Crestline Dr., Tujunga, Calif. 91042

[21] Appl. No.: 86,904

[22] Filed: Oct. 22, 1979

[51] Int. Cl.³ .............................................. B66F 3/00
[52] U.S. Cl. .................................................. 254/132
[58] Field of Search .................. 254/79, 80, 51, 62, 254/77, 80, 131.5, 132; 294/50.8, 50.9, 118; 81/425 R, 425 A, 426, 394, 409, 411; 7/114, 125

[56] References Cited

U.S. PATENT DOCUMENTS

| 139,177 | 5/1873 | Moloney | 81/409 |
|---|---|---|---|
| 361,205 | 4/1887 | Burrows | 254/132 |
| 492,721 | 2/1893 | Garnett | 294/50.9 |
| 826,728 | 7/1906 | Lind | 81/394 |
| 881,657 | 3/1908 | Bittner | 254/132 |
| 1,061,175 | 5/1913 | Guy et al. | 294/50.9 |
| 1,494,557 | 5/1924 | Lumry et al. | 254/131.5 |
| 1,576,290 | 3/1926 | Lenormand | 254/79 |
| 1,898,568 | 2/1933 | Pazzano | 81/426 |

*Primary Examiner*—Robert C. Watson
*Attorney, Agent, or Firm*—Harry R. Lubcke

[57] ABSTRACT

A plier-like implement having an elongated whole cylindrical element rigidly attached at right angles to one part of the plier adjacent to the joint and a mating elongated segment of a rigid cylindrical element attached at right angles to the other part of the plier. A weed stem is grasped adjacent to the soil between the cylindrical elements. The tool is then rotated about the whole cylindrical element, using the soil as a rolling fulcrum to incrementally force the weed out of the soil.

1 Claim, 5 Drawing Figures

WEED EXTRACTION APPARATUS

BACKGROUND OF THE INVENTION

This invention pertains to a hand tool and the method of using the same to extract weeds and the like from soil.

Weeds can be pulled from the soil in which they have grown by exerting a relatively strong vertical force by hand on the main stem of the weed. However, some large weeds, bushes and the like are so strongly rooted as to defy such extraction.

U.S. Pat. No. 3,985,382 shows a "V" claw type tool that has an upstanding handle. In use, the claw is forced beneath the soil with a horizontal motion and the stem-root engaged into the "V". Thereafter, a vertical movement upward of the handle lifts the weed out of the soil.

There is no mechanical advantage. Also, it may be difficult, or impossible from a practical standpoint, to use this tool if the soil is hard and compacted.

U.S. Pat. No. 3,847,226 shows a rigid blade type weeder. It has a bent sharp blade that enters the soil adjacent to the root of the weed. The elbow of the bend may be used as a fulcrum, pressing upon the soil below the surface of the soil to dislodge the root horizontally. This tool is claimed for removing weeds from lawns.

SUMMARY OF THE INVENTION

A plier-like hand tool having an elongated whole cylindrical element rigidly attached at right angles to one part of the plier adjacent to the joint of the plier. An approximately 75° segment of another elongated cylindrical element is rigidly attached to the other part of the plier and mates with the exterior surface of the wholly cylindrical element.

The weed is grasped adjacent to and above the surface of the soil with the tool substantially vertical. It is then rotated to approximately the horizontal, with the wholly cylindrical element utilizing the surface of the soil as a rolling fulcrum. The weed is thus incrementally forced out of the soil, and may then easily be pulled out of the soil.

A slip joint for the plier accommodates various sizes of weed stems.

DESCRIPTION OF THE PREFERRED EMBODIMENTS

Figure 1:
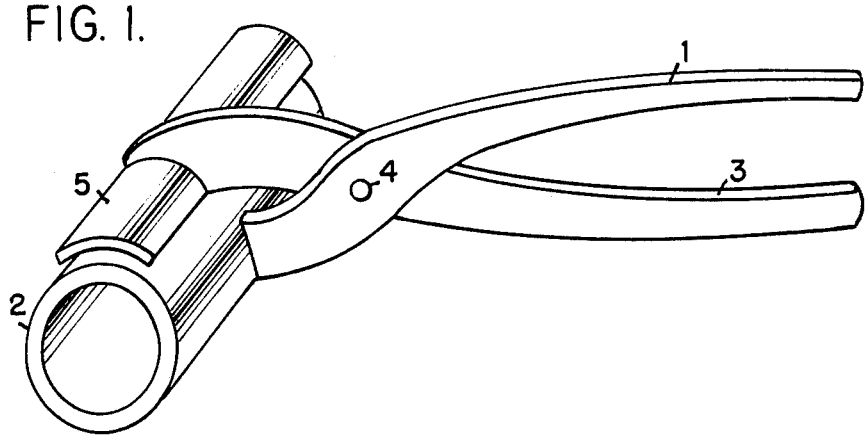
FIG. 1 shows a perspective view of the tool, with a single plier joint.

In FIG. 1 numeral 1 identifies the handle of one part of a plier. At the opposite end thereof an elongated rigid wholly cylindrical element 2 is attached at right angles to the handle, rigidly, as by welding. The cylinder may be hollow, with a stout wall thickness. A piece of pipe may be used for the material.

Handle 3 of the other part of the plier is fastened by a joint that allows rotation to the one part 1. In FIG. 1 this joint is a single joint, consisting of pin 4 fitted within relatively close-fitting holes in each part of the plier.

At the opposite end of the other part 3 of the plier an elongated segment of a rigid cylindrical element is attached at right angles to the handle, rigidly, as by welding.

This segment 5 is typically from 60° to 90° of a full cylindrical surface. It is attached to the other part 3 of the plier so as to conform to the shape of whole cylinder 2. The curvature of the inner surface of segment 5 is essentially the same as the curvature of the outer surface of cylinder 2. This allows a full grip of weed stem 7 (FIG. 5) for the circumferential extent of the segment.

Figure 5:
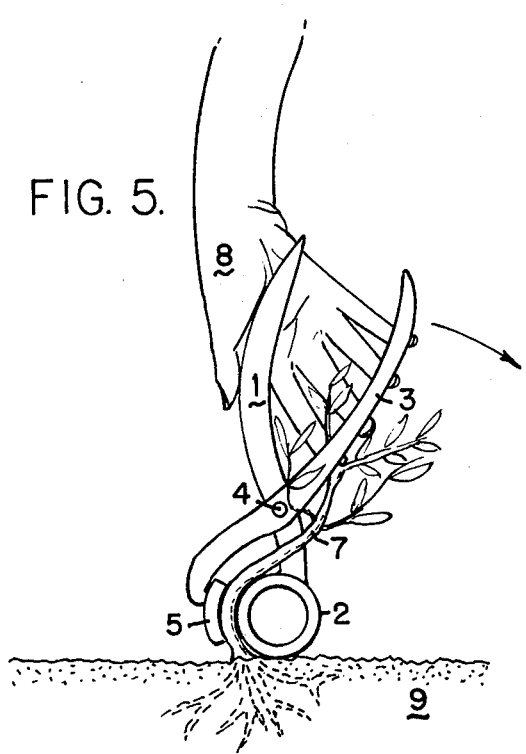
FIG. 5 illustrates the use of the tool in relation to a weed and the soil.

FIG. 5 illustrates the method of use of the tool.

Assuming a vertical weed stem, the tool is oriented vertically and opened by separating plier handles 1 and 3. This separated position of the handles is not shown, but will be easily understood.

Weed stem 7 is then surrounded by cylinder 2 and segment 5 and the handles are brought together, as by hand 8, or by two hands, if necessary.

While grasping the handles firmly so that stem 7 will be firmly grasped, the tool is rotated about cylinder 2. Cylinder 2 remains in contact with the surface of soil 9 so that a rolling fulcrum is obtained and a large force is exerted upon stem 7, breaking loose the roots from the soil and making it easy to further remove the weed by a vertical movement of the weed and the tool as a unit. The initial movement may be incremental, since only a small dislodgement is required to reduce the subsequent force for pulling the weed to a small value.

Figure 2:
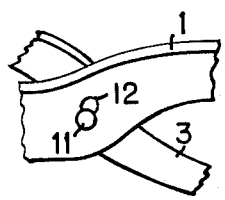
FIG. 2 shows a fragmentary view of the same, with a two-position plier slip joint.

FIG. 2 is a modification of the joint of the plier to the slip-joint type. Using the farther open position of the joint allows segment 5 to be farther away from cylinder 2 than before, but essentially parallel thereto, so as to engage a larger stem 7 in a effective manner.

In FIG. 2 a headed bolt 11 is non-rotatively and firmly fastened into plier part 3. Plier part 1 has two adjacent holes 12, one of which is seen in FIG. 2. The holes nearly coalesce into a slot, but not quite so, so that the bolt will rotate in one hole or the other without slipping over. The shank of bolt 11 has a flat portion to allow slip from one hole 12 to the other when such manipulation is purposely undertaken by the operator.

Figure 3:
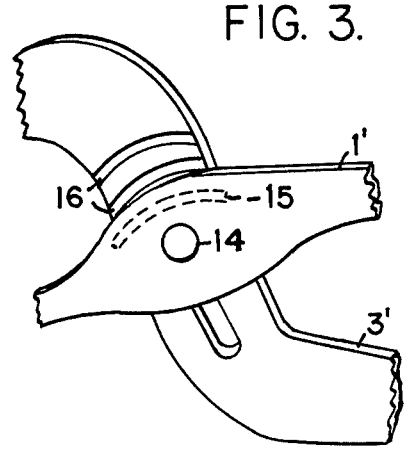
FIG. 3 shows a fragmentary view of the same, with a plural position plier channel-lock joint.

FIG. 3 shows another modification of the plier joint to a plural position channel-lock joint. This type of joint allows segment 5 to be even farther away from cylinder 2, if desired, while still retaining the essentially parallel engagement of these elements upon a still larger stem 7.

A headed bolt 14 is non-rotatively firmly fastened into plier part 1', which part also has one upstanding circular boss 15, with the center of that circle at the center of bolt 14. Plier part 3' has a pllurality, say five, of circular slots 16, which have the same radius as that of boss 15. Depending upon the diameter of weed stem 7, the operator selects a slot in which to engage boss 15, and then grasps the stem as though the joint of the plier were single.

Figure 4:
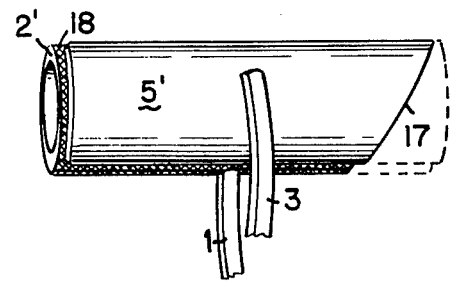
FIG. 4 shows a fragmentary view of the same as modified for auxiliary penetration of the soil.

FIG. 4 is a further modification, in which whole cylinder 2' and segment 5' are obliquely shaped with respect to the axis of the cylinder, along line 17. The parts of these elements away from the plier joint remain, and so form a sharp spade. This spade may be used to remove rocks or other extraneous objects from the vicinity of the weed, prior to using the tool for extracting the weed as has been set forth.

Steel is a preferred material for all of the parts of the tool of this invention. The plier parts may be forged and may include the cylinder 2 and segment 5, respectively. Alternately, the latter elements may be welded to the plier arms. The welded parts should be firmly attached.

The outer surface of whole cylinder 2' and the inner surface of segment 5' may be slightly knurled, as at 18. This is to provide improved adhesion of these elements to the stem of the weed. The knurling should be of such depth and texture so that stem 7 is not severed. The outer surface of whole cylinder 2 and the inner surface of segment 5 may also be knurled.

Only the mating surface of these elements need be knurled. Equivalent roughness may alternately be impressed when the elements are forged.

The extractor of this invention may be made in many sizes.

An average size has cylinder lengths of 10 cm, with a diameter of the working surfaces of 2.5 cm and a wall thickness of 4 mm. The overall length of the plier may be about 25 cm.

For delicate garden work a tool of half this size may be constructed, and for extracting large bushes the size may be increased up to four times the average size given.

The length of the whole cylinder must be sufficient to retain it substantially upon the surface of the soil when the prying action of the rolling fulcrum occurs.

The term "weed" has been used herein. However, it will be understood that this term includes plants of all kinds and any similar entity having the equivalent of a stem.

There may be a substitution of material for the tool as long as the strength and wearing qualities of steel are approximated.

For strongly rooted weeds, repeated grips can be taken with the tool upon the stem until it is fully loosened from the soil by repeated prying on the rolling fulcrum.

I claim:

1. A weed puller comprising;
  (a) a plier having a joint (4,11 or 14) and a pair of handles (1,3),
  (b) an elongated rigid whole cylindrical element (2') rigidly attached at right angles to one part of the plier adjacent to said joint, and
  (c) an elongated segment of a rigid cylindrical element (5') rigidly attached to the other part of the plier adjacent to said joint,
  being disposed to contact the full extent of said elongated rigid whole cylindrical element when the handles are together, and
  adjacent ends of said whole rigid cylindrical element (2') and said elongated segment of a rigid cylindrical element (5')
  being shaped obliquely (17) with respect to the axis of said whole rigid cylindrical element to form a spade.

* * * * *